Patented Nov. 12, 1946

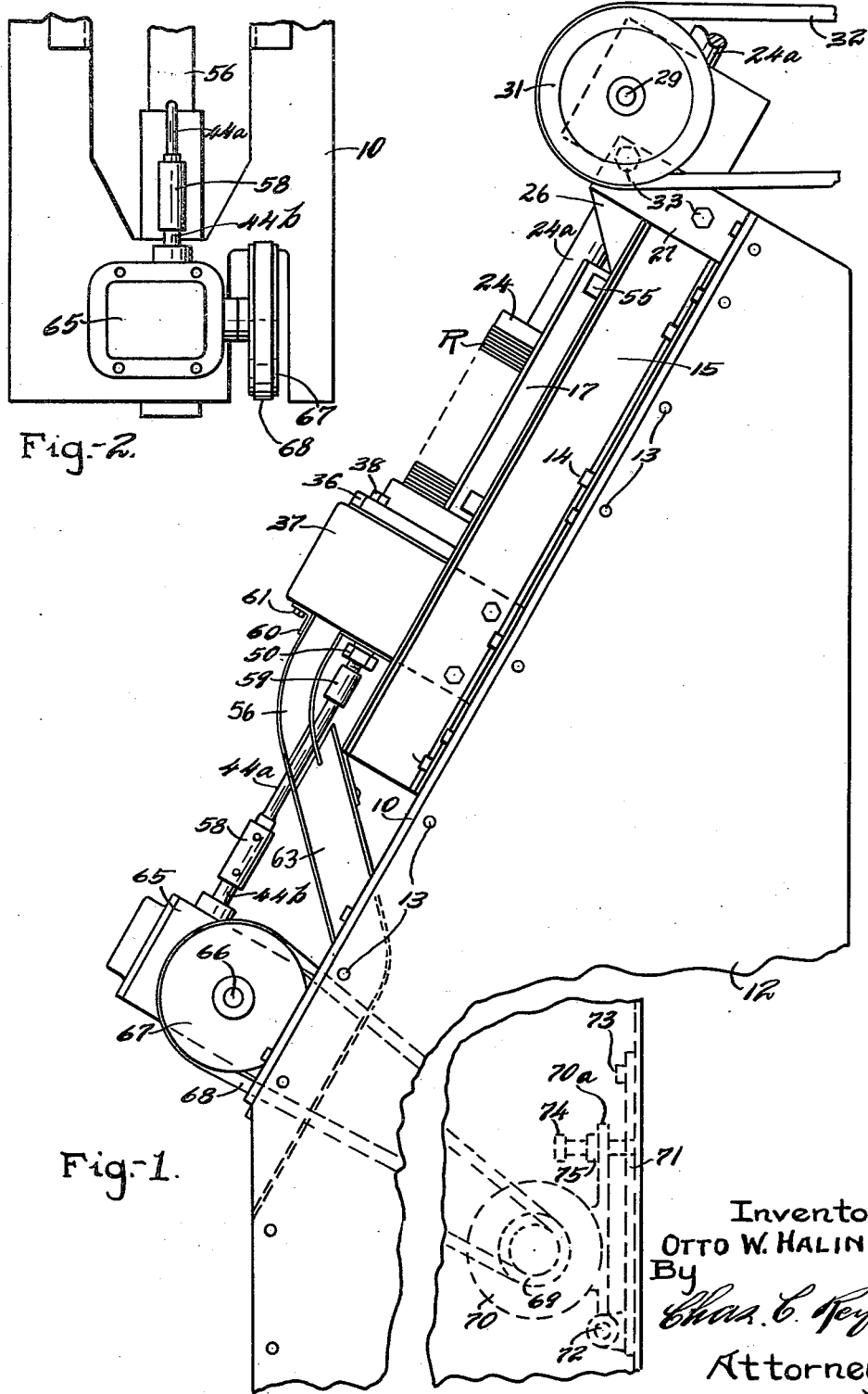

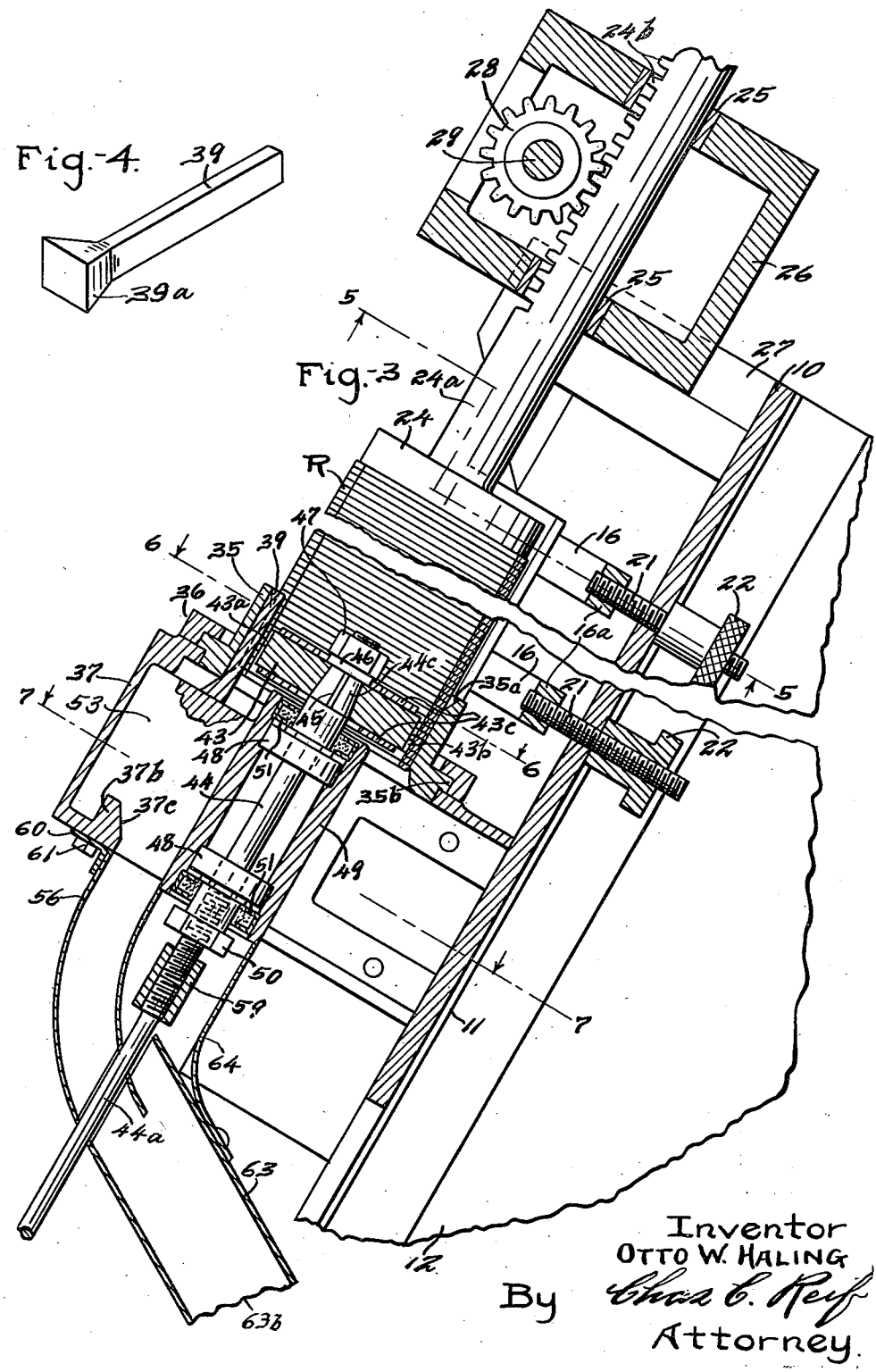

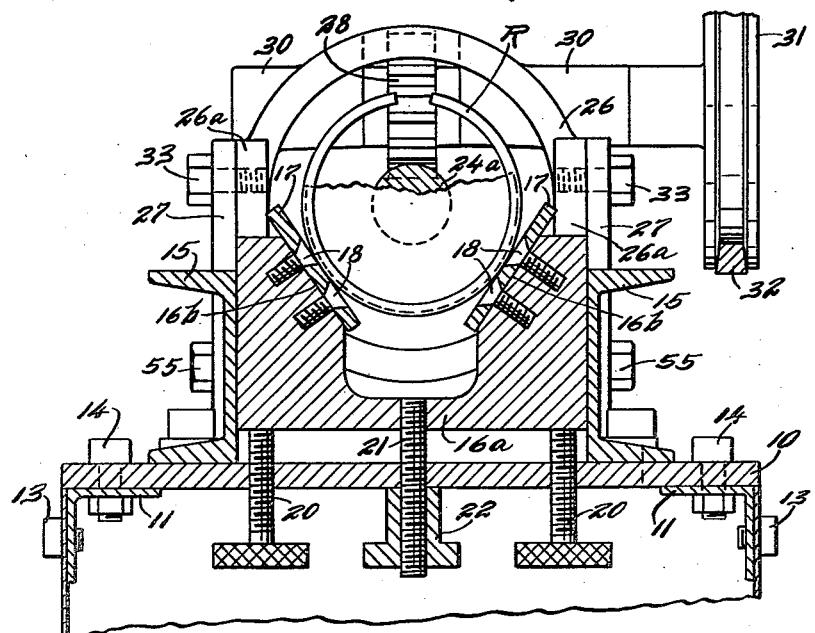
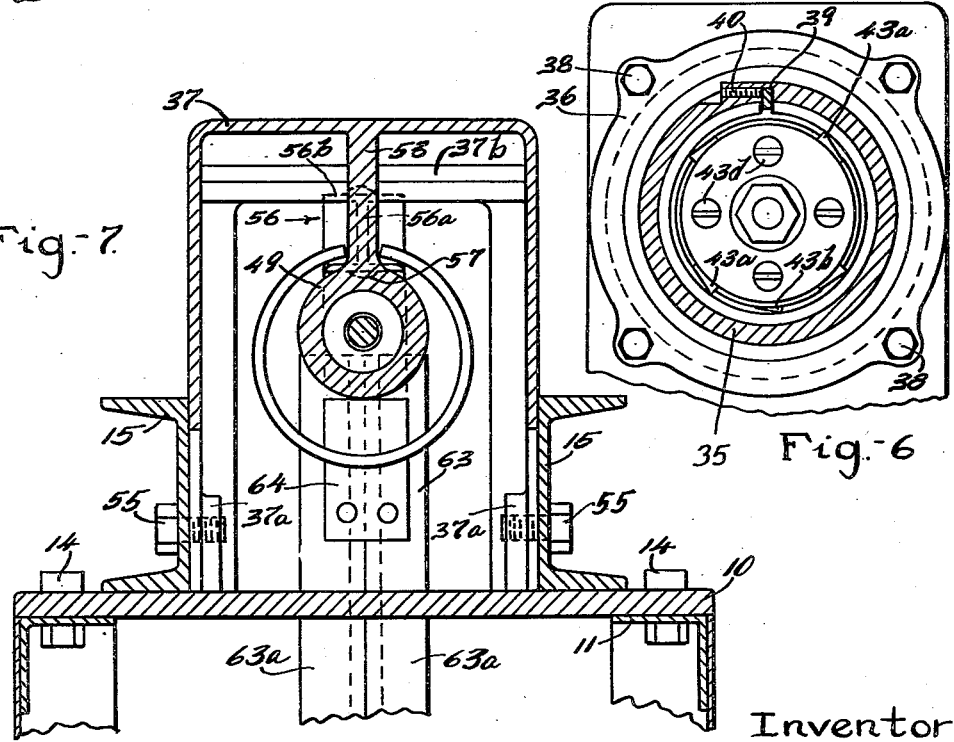

2,410,819

UNITED STATES PATENT OFFICE 2,410,819

RING BORING MACHINE

Otto W. Haling, Rochester, Minn., assignor to Burd Piston Ring Company, Rockford, Ill., a corporation of Illinois Application November 1, 1943, Serial No. 508,627

22 Claims. (Cl. 77—1)

This invention relates to a ring boring machine, and while the machine could be used for boring various kinds of rings, it particularly is designed for boring split piston rings such as are commonly used in internal combustion and automobile engines.

It is an object of this invention to provide a simple and efficient machine for feeding and boring said rings automatically, it only being necessary to load the rings into said machine.

It is a further object of the invention to provide a simple and efficient ring boring machine, having means for supporting and guiding said rings, a centering member for said rings, a boring head disposed concentrically of said centering member, a driving means for said boring head and means for supporting said driving means so that said rings are moved into said centering member, past said boring head to be bored thereby and then encircle said driving means and support therefor as they leave said boring head and move into a discharge chute, the rings moving downward and the space between the ends thereof passing said driving means.

It is more specifically an object of the invention to provide a machine for boring split piston rings comprising a guide means for supporting said rings on their peripheries, a substantially cylindrical centering member for receiving said rings from said guide means, a boring head disposed within and concentrically of said centering member, means for moving said rings into said centering member and past said boring head, a rib within said centering member disposed between the ends of said rings for preventing rotation thereof, a driving shaft for said boring head, supporting means for said driving shaft including bearings therefor, a flange for supporting said supporting means aligned longitudinally with said rib whereby as said rings move past said boring head and from said centering member the ends thereof will be disposed at either side of said flange with said rings encircling said means together with a discharge chute for said rings through which said shaft passes, said rings moving downward in said discharge chute so that the space between the ends thereof passes said shaft.

These and other objects and advantages of the invention will be fully set forth in the following description made in connection with the accompanying drawings in which like reference characters refer to similar parts throughout the several views and in which:

Fig. 1 is a view in side elevation of said machine, some parts being broken away;

Fig. 2 is a partial view in front elevation of said machine;

Fig. 3 is a central longitudinal vertical section of said machine;

Fig. 4 is a perspective view of a ring guiding means used;

Fig. 5 is a vertical section taken substantially on line 5—5 of Fig. 3 as indicated by the arrows;

Fig. 6 is a vertical section taken substantially on line 6—6 of Fig. 3 as indicated by the arrows; and Fig. 7 is a vertical section taken substantially on line 7—7 of Fig. 3 as indicated by the arrows.

Referring to the drawings, a machine is shown supported upon a base plate 10, and while this plate could be variously supported, in the embodiment of the invention illustrated it is shown as secured to a pair of oppositely disposed angle members 11 which in turn are supported by vertical plates 12 disposed at the outer sides of said angle members and secured thereto in any suitable manner as by screws 13. Base plate 10 is illustrated as secured to angles 11 by headed and nutted bolts 14. A pair of oppositely disposed channels 15 are supported in spaced relation upon plate 10 with their webs disposed vertically and their flanges extending outwardly. As shown in Fig. 1, the machine is disposed with plate 10 and thus channels 15 extending in an upwardly inclined direction.

Disposed adjacent one end of channels 15 are spaced members 16 having downwardly extending side portions and a connecting portion 16a so as to be of general U-shape. The upper portions of members 16 have inclined surfaces 16b sloping downwardly toward each other and plates 17 are secured to these surfaces by the headed screws 18 having their heads countersunk into the plates 17. Plates 17 incline toward each other to form a trough and the rings R to be bored are supported with their peripheries in contact with plates 17. Screws 20 are threaded through plate 10 and engage the bottoms of members 16 at either side thereof. A screw 21 is threaded into the center of portion 16a and extends through plate 10, the same having a nut 22 on the lower end thereof. Nut 22 is provided with a flange at its end, the periphery of which and the peripheries of the heads of screws 20 are preferably knurled as shown in Fig. 5. A plunger 24 illustrated as of cylindrical form, is disposed centrally over the trough formed by plate 17, said plunger having a shaft 24a extending therefrom suitably supported in bearings 25 carried in a frame or housing 26 carried on suitable supports 27 upstanding from plate 10 at one end of the latter. Frame 26 is secured to standards 27 by headed bolts 33 threaded into lugs 26a on frame 26. Shaft 24a is provided with gear teeth at the top thereof, thus forming a rack and a pinion 28 meshes with teeth 24b. Pinion 28 is carried on a shaft 29 supported in suitable bearings 30 on frame member 26, said shaft extending to one side of the machine and having secured thereto a pulley 31. Pulley 31 will be driven by a suitable belt 32 which in turn will be driven from some suitable source of power not shown.

A centering member 35 is provided at one end of plates 17, said member 35 being of general cylindrical form so as to support the rings R at points disposed circumferentially of their peripheries. In the embodiment of the invention illustrated member 35 is shown as a cylindrical shell having an outwardly flaring surface 35a at its end. Member 35 has a flange 35b which is engaged by an inwardly extending flange on a ring 36 which in turn is bolted to a frame or housing member 37 by circumferentially spaced headed bolts 38. Various sizes of members 35 will be used for the various sizes of rings to be bored and it will be seen that such members may be held within ring 36. It will only be necessary to remove ring 36 and substitute another size of member 35. Secured to the top of member 35 at the inner side thereof and extending longitudinally thereof is a member 39 in the form of a rib of rectangular shape in vertical cross section, said rib having an enlarged flaring end 39a. As shown in Fig. 6, rib 39 may be held in place by a set screw 40 extending laterally from the cut out portion of shell 35. As shown, rib 39 extends centrally of member 35 at the top thereof. A boring head 43 is provided which will usually, though not always, be disposed concentrically with the bore of member 35, and while any suitable type of boring head may be used, in the embodiment of the invention illustrated head 43 is shown as having a central body carrying a plurality of roughing cutters 43a disposed circumferentially thereof and preferably at one face thereof. Head 43 also carries inwardly of cutters 43a a finishing cutter 43b. While cutters 43a and 43b could be held in any suitable manner, in the embodiment of the invention illustrated head 43 is shown as having plates 43c at each side thereof, one of which will overlie said cutters, said plates being held in position by circumferentially spaced headed screws 43d. Boring head 43 is supported upon and driven by a shaft or spindle 44 having a tapered portion 44c disposed in head 43, said head being held by a suitable key 45. A washer 46 is shown at the end of shaft 44 surrounding a reduced and threaded end portion thereof, which portion is also equipped with a nut 47. Shaft 44 extends downwardly or to the rear of head 43 and is suitably supported in bearings 48 carried in a bearing member or casing 49. Bearings 48 are shown as engaging shoulders in member 49 at their adjacent sides and are tightened and held in place by a nut 50 threaded on shaft 44 and arranged to engage the outer bearing 48. Sealing members 51 are shown disposed at the ends of bearing member 49 to provide an oil seal therefor. The bearing member 49 is supported within the circle defined by the rings on a web or rib 53 which extends upwardly generally radially from the bearing member outwardly through the gaps in said rings as clearly shown in Fig. 7. The web 53 is rigidly supported by the housing 37 in any suitable manner, being herein disclosed as formed integral with and depending from the top wall of housing member 37, which is generally U-shaped in cross-section and extends over the bearing member 49 and is secured by its side walls to channel members 15 as shown in Fig. 7, by the headed bolts 55. Member 37 has bosses 37a at its inner sides for receiving the threaded ends of bolts 55. The web 53 is aligned longitudinally with rib 39 and is of the same width as the end of flared portion 39a so that the gap portions of the rings will slide easily from the rib 39 onto the web 53. Member 37 also has extending transversely thereof a bar or projection 37b having a lower downwardly inclined surface 37c. A discharge guide or chute 56 is provided and while this might be variously formed, in the embodiment of the invention illustrated it is shown as comprising a central vertical member 56a to the top and bottom of which transverse plates 56b are secured by suitable screws 57. Chute 56 is thus generally I-shaped in cross section. Shaft 44 is shown as having an extension 44a secured to shaft 44 by a coupling 59 threaded onto shaft 44 and portion 44a. Shaft 44a extends through discharge guide or chute 56 as shown in Fig. 3. Guide 56 is secured in position by an angle member 60 secured to the top thereof in any suitable manner as by welding and secured to the end of member 37 by a headed screw 61. The central vertical member 56a is alined with and extends from the web 53 to the extension 44a of the shaft 44 to guide the gaps of the rings to the said extension 44a. A lower discharge guide or chute 63 is provided, and while this might be variously formed, in the embodiment of the invention illustrated, it is formed by a pair of channel members 63a, having their web portions secured back to back and their flanges projecting in opposite directions. Said discharge chute 63 is thus also generally I-shaped in cross section. Chute 63 is supported by a plate 64 having its lower end riveted to chute 63 and its other end secured in any suitable manner to bearing member 49. The web portions of the channel members 63a form a central member 63b which is alined with and guides the gaps of the rings from the extension 44a of the shaft 44, to the point of delivery. Shaft 44a is connected by a coupling 58 to a shaft 44b which extends into a speed reducing device 65 supported in any suitable manner upon plate 10. A shaft 66 extends laterally from the speed reducing mechanism and has secured thereto a pulley 67. Pulley 67 will be driven by a belt 68 extending laterally and downwardly to a pulley 69 secured to the armature shaft of a motor 70 having a base flange 70a hinged to a plate 71 by the pivot or pintle 72. Plate 71 will be secured to the wall or any convenient supporting member by headed screws 73. Flange 70a can be adjusted toward and from plate 71 by a headed screw 74 threaded therein and rotatable in plate 71, said screw being provided with a suitable jam nut 75. Standards 27 are preferably welded to the ends of channels 15.

In operation, the rings to be bored will be loaded into the trough formed by plates 17, plunger 24 being withdrawn by rotation of pinion 28. The rings will be supported on their peripheries by plates 17 as stated, and will extend at right angles to the surface of said plates as shown in Figs. 1 and 3. Plunger 24 will be moved to engage the uppermost ring and said plunger will be moved at the desired speed by rotation of pinion 28, which as stated, will be driven from a suitable source of power by belt 32. The rings R will thus be moved into the centering member 35. The rings are disposed on plates 17 with the space between the ends thereof at their tops. As said rings are moved into centering member 35 they are centered and contracted by engaging the flaring surface 35a and the ends thereof are brought into contact with the sides of rib 39. Said rings are thus now accurately positioned and kept from any rotation. The rings while thus held contracted accurately to a predetermined diameter and properly centered are pushed past cutter head 43 and are thus bored accurately to the desired internal diameter. The bored rings are still guided in the small diameter portion of centering member 35 a short distance in their travel beyond the cutter head, and as they leave the small diameter of centering member 35 they again expand and the ends thereof are then disposed in contact with the flaring sides of the end portion 39a of rib 39. The rings continue downwardly and their gaps are guided by the tapered end 39a of rib 39 onto web 53 so that the ends thereof thus become disposed at either side of web 53. The rings at this time are encircling or surrounding the bearing member 49 as clearly shown in Fig. 7. The rings continue to be moved downwardly and after passing bearing member 49 they come into position with their inner peripheries engaging or hanging on the flanges of guide member 56. Member 37b and surface 37c are provided so that the rings are deflected downwardly somewhat if of a diameter to engage surface 37c. The rings now surround shaft 44a and coupling 59 and slide downwardly on the guide member 56. As the rings move downwardly the spaced ends or "gaps" pass over shaft 44a, or in other words, shaft 44a could be said to pass through the gaps between the ends of said rings. Said rings then drop onto the larger guide 63 and move along this guide down to the front of the machine is shown in Fig. 1. Guide 63 extends downwardly as shown in Fig. 3, and then extends parallel to plate 10 as shown in Fig. 1. The rings thus are delivered at the front of the machine between the lower end of plate 10 and can be received or disposed as desired.

The guide plates 17 can be adjusted for different sized rings by lowering members 16 by turning screws 20. Said members will be locked in position by nuts 22 on the screws 21. As stated, different sizes of centering members 35 can readily be placed in position by the removal of ring 36.

From the above description it will be seen that I have provided a simple, efficient and automatic machine for boring split rings. Said machine requires little or no supervision after the rings are placed therein and the rings are very rapidly bored and discharged from said machine. With the use of this machine the number of rings bored in a given period of time has been increased many fold. The machine is simple and compact and can be made to sell at a very reasonable price. The same has been amply demonstrated in actual price and found to be highly successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A ring boring machine having in combination, means for supporting split rings, a member adjacent said means for centering said rings relative to one another and engaging the same about their peripheries, means for moving said rings into said member, a boring head operating within said member for boring said rings as they are moved through said member and past said head, and means for supporting and discharging said rings after they pass said head.

2. A ring boring machine having in combination, means for supporting split rings, a member adjacent said means for centering said rings relative to one another and engaging the same about their peripheries, means for moving said rings into said member, a boring head operating within said member for boring said rings as they are moved through said member and past said head, driving means for said boring head, said rings passing over said driving means and surrounding the same as they pass from said boring head, and discharge means for supporting and guiding said rings.

3. A ring boring machine having in combination, means for supporting split rings upon their peripheries, a member for centering said rings relative to one another having one side substantially aligned with said first mentioned means and engaging said rings circumferentially thereof, means for moving said rings into said member for centering the same relative to one another, a boring head within said member for boring said rings as they are moved past said head in said member, means disposed between the ends of said rings in said member for preventing rotation of said rings, a driving means for said boring head including a shaft, said rings surrounding and passing over said driving means after leaving said head, and a discharge chute into which said rings are moved, said chute being arranged so that the spaced ends of the rings pass over said shaft.

4. The structure set forth in claim 3, said first mentioned means comprising a trough having inclined diverging sides, means for adjusting said trough radially relative to said centering means and boring head to different positions, and means for holding said trough in adjusted position.

5. A ring boring machine having in combination, a guide member having inclined sides for supporting a plurality of split rings on their peripheries, a centering member of generally cylindrical form substantially aligned with said guide means, means for moving said rings from said guide means into said centering member, a boring head operating within said centering member, a rib at one side of said centering member disposed between the ends of said split rings to prevent rotation of said rings by said boring head, a driving means for said boring head including a shaft extending downwardly from the head, a bearing for said shaft, a supporting member for said bearing, a rib supporting said supporting member and aligned with said first rib so that said rings encircle said supporting member and move thereover with said second rib disposed between the ends thereof, and a discharge chute for receiving said rings after they pass said bearing, said shaft passing through said chute, said rings moving downwardly so that the spaced ends of the rings pass over said shaft.

6. A ring boring machine having in combination, a trough having inclined sides for supporting a plurality of split rings, a plunger disposed centrally relative to said trough constructed and arranged to engage the endmost ring, means for moving said plunger to move said rings, a member of generally cylindrical form aligned with said trough for receiving rings therefrom, said member having a flaring cylindrical bore for centering said rings relative to one another as they are pushed therein by said plunger, a boring means arranged within said member for boring said rings as they are moved therethrough, means disposed between the ends of said split rings for holding them from rotation while in said member, and means for supporting and discharging said rings after they move out of said member.

7. A ring boring machine having in combination, a member engaging split rings about their peripheries, a boring means disposed within said member, means for moving said split rings through said member and past said boring means, a shaft for driving said boring means, bearings for said shaft, a casing supporting said bearings, a rib supporting said casing, said rings encircling said casing with their ends disposed at either side of said rib, and a chute having a central member aligned with said rib and a transverse member for supporting said rings, said shaft passing through said chute and said rings moving in said chute with the spaced ends passing over said shaft.

8. A ring boring machine having in combination, a boring means, means for moving split rings past said boring means, driving means for said boring means, a member disposed beyond said boring means having a vertical rib for supporting said driving means, said split rings moving with their ends at each side of said rib respectively and a chute having a vertical member aligned with said rib and a transverse member for supporting said rings.

9. A ring boring machine having in combination, a centering member, a boring means arranged within with said centering member, means for moving split rings through said member and past said boring means, a driving means for said boring means, a supporting means for said driving means, a chute beyond said supporting means, said centering member, supporting means, and said chute all having aligned members disposed between the ends of said split rings as said rings move longitudinally thereof.

10. A ring boring machine having in combination, a boring head for boring split rings, means for moving said rings past said head concentrically thereof, a chute into which said rings are moved after leaving said head, and a second chute receiving said rings from said first mentioned chute, said chutes having a central member disposed between the ends of said split rings.

11. A ring boring machine having in combination, a trough having downwardly inclined sides for supporting a plurality of split rings, a centering member centrally aligned with said trough, a boring head arranged within said centering member, means for moving said split rings from said trough into said centering member and past said boring head, and means disposed between the ends of said split rings as they are moved through said member for holding said rings from rotation.

12. A ring boring machine having in combination, means for supporting a plurality of separate split rings, a member into which said rings are successively moved for centering and contracting the same, a member engaged at its sides by the spaced ends of said split rings to hold said rings from rotation, a longitudinally stationary boring means for boring said rings while so contracted and in engagement with said last mentioned member, and means for moving said separate rings into said first mentioned member and past and over said boring means.

13. The structure set forth in claim 12, a driving means for said boring means, and means for supporting said driving means having a portion alined with said last mentioned member and engaged at its sides by the ends of said split rings as they are moved beyond said last mentioned member.

14. A ring boring machine having in combination, means for supporting a plurality of separate split rings, means into which said rings are moved for centering and contracting the same, means for holding said rings from rotation, a longitudinally stationary boring means disposed concentrically of said third mentioned means and means for pushing said separate rings along said first mentioned means into said third mentioned means and into engagement with, past said boring means and over the latter.

15. The structure set forth in claim 14, a driving means extending from said boring means, said rings being moved from said boring means along and around said driving means.

16. A ring boring machine having, in combination, a centering member for slidably supporting split rings about their peripheries for a boring operation, a boring head operating within said member for boring said rings as they are moved through said member past said head, a radial projection in said centering member extending lengthwise thereof disposed between the ends of said rings to prevent rotation thereof, a spindle for supporting the boring head, a bearing for said spindle within the circle defined by said rings, a support for the bearing spaced radially therefrom, and a generally radially extending support for said bearing connecting said bearing and the aforesaid support and longitudinally aligned with the aforesaid radial projection and disposed between the ends of said rings in their movement from the boring head.

17. A structure as set forth in claim 16, wherein the radial projection is of narrow width in relation to the increased width of the radial support to fit between the closely spaced ends of the rings in the centering member, said rings being contracted while disposed in said centering member for the boring operation, the structure including means providing flaring guide surfaces between said radial projection and said radial support for smoothly guiding the spaced ends of said rings in their movement onto said radial support after the boring operation.

18. In a ring boring machine, the combination of a boring head adapted for internally boring split rings in their movement past said head, a spindle for supporting said head, a bearing for said spindle, a support for said bearing spaced radially with respect thereto, and a generally radially extending support for said bearing connecting said bearing and the aforesaid support and arranged to be disposed between the spaced ends of said rings to guide the same in their movement away from the boring head after the boring operation.

19. In a boring mechanism for split piston rings and the like, the combination with a driven boring spindle of a member for locating the rings in a predetermined relation to said spindle, and means extending through the gaps in the rings to support said spindle to permit relative axial movement between the boring spindle and rings.

20. In a boring mechanism for split piston rings and the like, the combination with a driven boring spindle of a guide member to guide the rings into a predetermined axial relationship with said spindle, a projection in said guide member entering the ring gaps to prevent turning of said rings, and means extending through the ring gaps to support said spindle the permit relative axial movement between the boring spindle and rings.

21. A boring mechanism as set forth in claim 19, wherein the boring spindle has an extension, at least a portion of which is of a diameter small enough to pass freely through the gaps in the rings.

22. A boring mechanism as set forth in claim 20, wherein the boring spindle has an extension, at least a portion of which is of a diameter small enough to pass freely through the gaps in the rings.

OTTO W. HALING.